US006791626B2

(12) United States Patent
Yamamoto et al.

(10) Patent No.: US 6,791,626 B2
(45) Date of Patent: Sep. 14, 2004

(54) INPUT SWITCHING CIRCUIT FOR A TELEVISION TUNER IMMUNE TO INTERFERENCE DUE TO FM BROADCASTING SIGNAL

(75) Inventors: Masaki Yamamoto, Fukushima-ken (JP); Toshiro Furuta, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 406 days.

(21) Appl. No.: 09/938,132

(22) Filed: Aug. 23, 2001

(65) Prior Publication Data

US 2002/0057381 A1 May 16, 2002

(30) Foreign Application Priority Data

Aug. 31, 2000 (JP) ........................................ 2000-268405

(51) Int. Cl.[7] .................................................. H04N 5/46
(52) U.S. Cl. ........................ 348/729; 348/731; 348/706
(58) Field of Search ....................... 348/729; 455/178.1, 455/180.2, 180.4, 179.1, 187.1, 188.2, 191.3; H04N 5/44, 5/46, 5/50

(56) References Cited

U.S. PATENT DOCUMENTS

| 5,212,828 | A | * | 5/1993 | Hatashita et al. ............ 455/295 |
| 5,313,660 | A | | 5/1994 | Lindenmeier et al. |
| 6,344,881 | B1 | * | 2/2002 | Endo ........................... 348/729 |
| 6,351,294 | B1 | * | 2/2002 | Yamamoto et al. ........... 348/731 |
| 6,573,949 | B1 | * | 6/2003 | Yamamoto .................... 348/731 |

OTHER PUBLICATIONS

Japanese Unexamined Patent Application Publication No. 10-322236, Dec. 1998, Japan.
Japanese Unexamined Patent Application Publication No. 5-344437, Dec. 1993, Japan.

* cited by examiner

Primary Examiner—Michael H. Lee
Assistant Examiner—Trang U. Tran
(74) Attorney, Agent, or Firm—Brinks Hofer Gilson & Lione

(57) ABSTRACT

An input switching circuit for a television tuner includes first and second switching circuits provided between first and second input terminals to which a television signal and an FM broadcasting signal are input and an output terminal. The second switching circuit passes the FM broadcasting signal when receiving the FM broadcasting signal while blocking the FM broadcasting signal when receiving the television signal between the second input terminal and the output terminal. The second switching circuit includes first two diodes connected in series with each other between the second input terminal and the output terminal, which are turned off when receiving the television signal and turned on when receiving the FM broadcasting signal; and a second diode connected between the node between the first two diodes and the ground, which is turned on when receiving the television signal and turned off when receiving the FM broadcasting signal.

3 Claims, 4 Drawing Sheets

INPUT SWITCHING CIRCUIT FOR A TELEVISION TUNER IMMUNE TO INTERFERENCE DUE TO FM BROADCASTING SIGNAL

BACKGROUND OF THE INVENTION

1. Field of the Invention

The present invention relates to an input switching circuit for a television tuner, which switches input between a television signal and an FM broadcasting signal.

2. Description of the Related Art

In a television tuner which allows reception of FM broadcasting signals, input to a tuning circuit is switched between a television signal and an FM broadcasting signal.

FIG. 3 shows the configuration of a conventional input switching circuit for such a television tuner. Referring to FIG. 3, between a first input terminal 41 to which a television signal is input and an output terminal 42, a high-pass filter 43, a trap circuit 44, and a first switching circuit 45 are provided, in that order. The high-pass filter passes the lowest frequency of the television signal (approximately 50 MHz) and higher, and the trap circuit 44 attenuates frequencies around 27 MHz which is used as the citizens' band.

The first switching circuit 45 includes two switching diodes 45a and 45b connected in series between the first input terminal 41 and the output terminal 42, the anodes thereof being connected to each other, and a switching diode 45c, the cathode thereof being connected to the anodes of the switching diodes 45a and 45b and the anode thereof being grounded at high frequencies.

The node between the anodes of the switching diodes 45a and 45b and the cathode of the switching diode 45c is connected to a power supply terminal 46, and the cathodes of the switching diodes 45a and 45b and the anode of the switching diode 45c are connected to a switching terminal 47.

Meanwhile, between a second input terminal 48 to which an FM broadcasting signal is input and the output terminal 42, a high-pass filter 49 which passes the FM broadcasting signal, a second switching circuit 50, and a tuned circuit 51 which is tuned to the frequencies (88 to 108 MHz) of the FM broadcasting signal are provided, in that order. The second switching circuit 50 includes two switching diodes 50a and 50b connected in series between the second input terminal 48 and the output terminal 42, the anodes thereof being connected to each other, and a switching diode 50c, the cathode thereof being connected to the anodes of the switching diodes 50a and 50b and the anode thereof being grounded at high frequencies.

The node between the anodes of the switching diodes 50a and 50b and the cathode of the switching diode 50c is connected to the switching terminal 47, and the cathodes of the switching diodes 50a and 50b and the anode of the switching diode 50c are connected to the collector of a switching transistor 52.

The collector of the switching transistor 52 is connected to the power supply terminal 46, the base thereof is connected to the switching terminal 47, and the emitter thereof is grounded.

One end of the tuned circuit 51 is connected to the cathode of the switching diode 50b, and the other end thereof is grounded.

Furthermore, although not shown, an input tuning circuit which can be tuned to different frequencies of the television signal and the FM broadcasting signal is provided subsequent to the output terminal 42.

In the construction as above, when receiving a television signal, a low level switching voltage (e.g., 0 volts) is applied to the switching terminal 47. Then, in the first switching circuit 45, the switching diodes 45a and 45b are turned on and the switching diode 45c is turned off. Thus, the television signal input to the first input terminal 41 is passed through the first switching circuit 45 and output to the output terminal 42. Referring to FIG. 4, A indicates the transmission characteristics between the first input terminal 41 and the output terminal 42 at this time, in which frequencies around 27 MHz are attenuated and frequencies at and above approximately 50 MHz are transmitted.

At this time, the switching transistor 52 is turned off; thus, in the second switching circuit 50, the switching diodes 50a and 50b are turned off and the switching diode 50c is turned on. Thus, the FM broadcasting signal input to the second input terminal 48 is blocked by the second switching circuit 50, not being output to the output terminal 42.

Meanwhile, when receiving an FM broadcasting signal, a high level switching voltage (e.g., a voltage equivalent to the voltage applied to the power supply terminal 46) is applied to the switching terminal 47. Then, in the first switching circuit 45, the switching diodes 45a and 45b are turned off and the switching diode 45c is turned on. Thus, the television signal input to the first input terminal 41 is blocked, not being output to the output terminal 42.

At this time, the switching transistor 52 is turned on; thus, in the second switching circuit 50, the switching diodes 50a and 50b are turned on and the switching diode 50c is turned off. Thus, the FM broadcasting signal input to the second input terminal 48 is passed through the second switching circuit 50 and output to the output terminal 42.

As described above, in the second switching circuit 50, the switching diodes 50a and 50b are turned off and the switching diode 50c is turned on when receiving the television signal. However, at this time, the switching diodes 50a and 50b have a minute capacitance on the order of 0.5 pF across the terminals thereof, the terminals of the switching diodes 50c are not short-circuited completely, and the tuned circuit 51 is provided between the second switching circuit 50 and the output terminal 42 (i.e., externally to the tuned circuit 50); thus, the FM broadcasting signal input to the second input terminal 48 leaks from the second switching circuit 50, is tuned to by the tuned circuit 51, and appears at the output terminal 42.

Referring to FIG. 4, B indicates the transmission characteristics between the second input terminal 48 and the output terminal 42 at this time, in which a peak indicated by b is observed between 88 MHz and 108 MHz. Thus, interference due to the FM broadcasting signal occurs in receiving the television signal.

SUMMARY OF THE INVENTION

Accordingly, it is an object of the present invention to provide an input switching circuit for a television tuner, in which leakage of an FM broadcasting signal is reduced when receiving a television signal, preventing interference due to the FM broadcasting signal.

To this end, the present invention provides an input switching circuit for a television tuner. The television tuner includes a first input terminal, to which a television signal is input; a second input terminal, to which an FM broadcasting signal is input; an output terminal; a first switching circuit provided between the first input terminal and the output terminal, which, between the first input terminal and the output terminal, passes the television signal when receiving the television signal while blocking the television signal when receiving the FM broadcasting signal; and a second switching circuit provided between the second input terminal and the output terminal, which, between the second input terminal and the output terminal, passes the FM broadcasting signal when receiving the FM broadcasting signal while blocking the FM broadcasting signal when receiving the television signal. The second switching circuit includes first two diodes connected in series with each other between the second input terminal and the output terminal, which are turned off when receiving the television signal and turned on when receiving the FM broadcasting signal; and a second diode connected between the node between the first two diodes and the ground, which is turned on when receiving the television signal and turned off when receiving the FM broadcasting signal. Furthermore, a parallel-tuned circuit which is tuned to the frequencies of the FM broadcasting signal is connected in parallel to the second diode. Thus, when receiving the television signal, the second switching diode inhibits the parallel-tuned circuit from tuning to the FM broadcasting signal, and therefore, the FM broadcasting signal input to the second input terminal is substantially blocked by the second switching circuit, the output level thereof at the output terminal being extremely low. Accordingly, no peak is observed in the FM broadcasting band, preventing interference due to the FM broadcasting signal.

Preferably, a series-tuned circuit including a first capacitor and an inductor is provided between the second input terminal and the second switching circuit, the series-tuned circuit being tuned to the frequencies of the FM broadcasting signal. Thus, when receiving the FM broadcasting signal, the series-tuned circuit, together with the parallel-tuned circuit, passes the FM broadcasting signal while attenuating signals at other frequencies.

More preferably, a second capacitor is connected between one end of the series-tuned circuit and the ground, the series-tuned circuit and the second capacitor constituting a low-pass filter at and above the frequencies of the FM broadcasting signal, the cutoff frequency of the low-pass filter being set between the lowest frequency of the VHF high band and the highest frequency of the FM broadcasting signal. Thus, when receiving the FM broadcasting signal, the television signal in the VHF band and above is attenuated, preventing interference due thereto.

DESCRIPTION OF THE PREFERRED EMBODIMENT

Figure 1:
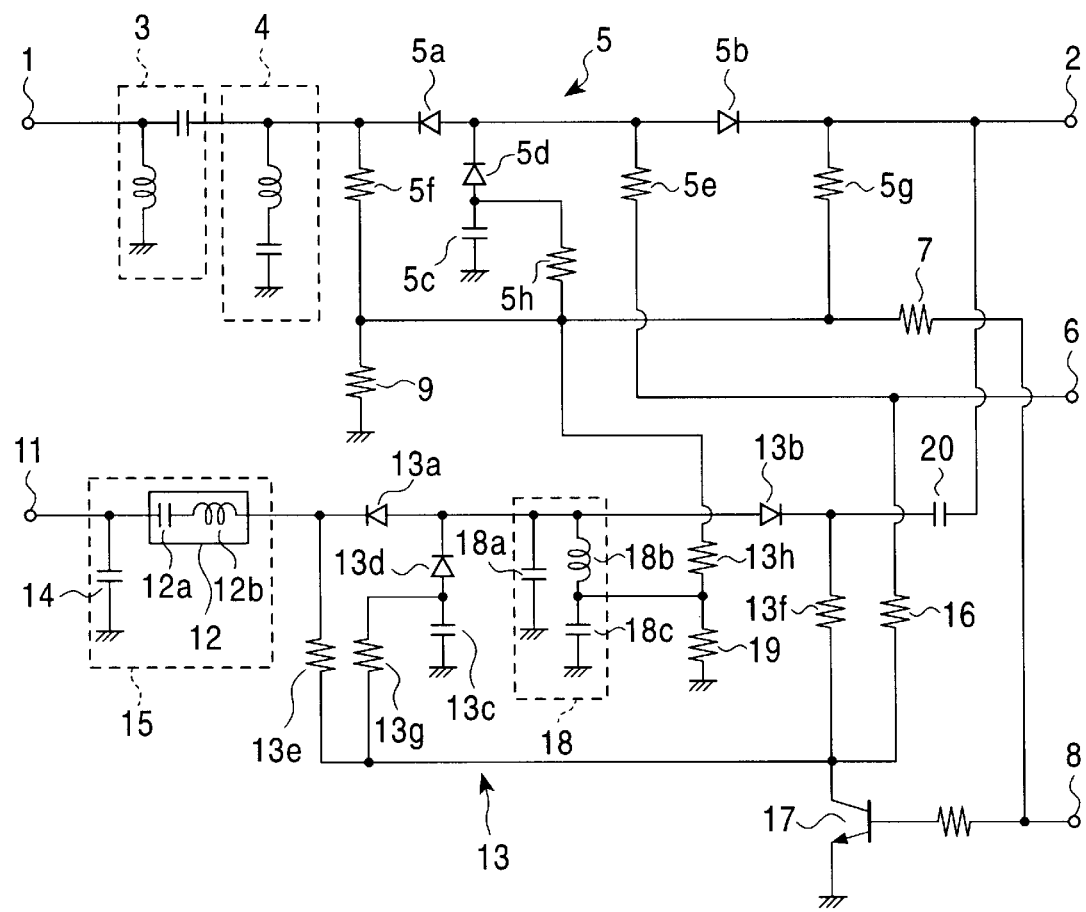
FIG. 1 is a circuit diagram of an input switching circuit for a television tuner according to an embodiment of the present invention.

FIG. 1 shows the configuration of an input switching circuit for a television tuner according to an embodiment of the present invention. Referring to FIG. 1, between a first input terminal 1 to which a television signal is input and an output terminal 2, a high-pass filter 3, a trap circuit 4, and a first switching circuit 5 are provided, in that order. The high-pass filter 3 passes frequencies at and above the lowest frequency of the television signal (approximately 50 MHz), and the trap circuit 4 attenuates the 27 MHz band used by citizens' band communications devices.

The first switching circuit 5 includes first switching diodes 5a and 5b connected in series between the first input terminal 1 and the output terminal 2, the anodes thereof being connected to each other, and a second switching diode 5d, the cathode thereof being connected to the anodes of the first switching diodes 5a and 5b and the anode thereof being grounded at high frequencies via a ground capacitor 5c.

The node between the anodes of the first switching diodes 5a and 5b and the cathode of the second switching diode 5d is connected to a power supply terminal 6 via a resistor 5e. A voltage on the order of five volts is applied to the power supply terminal 6. The cathode of the first switching diode 5a and the cathode of the first switching diode 5b are each connected to the anode of the second switching diode 5c via resistors 5f, 5g, and 5h so as to conduct direct current, and the node between the resistors 5f, 5g, and 5h is connected to a switching terminal 8 via a resistor 7. The node between the resistors 5f, 5g, 5h, and 7 is grounded via a resistor 9.

Meanwhile, between a second input terminal to which an FM broadcasting signal is input and the output terminal 2, a series-tuned circuit 12 and a second switching circuit 13 are provided, in that order. The series-tuned circuit 12 includes a first capacitor 12a and an inductor 12b, and is tuned substantially to the center frequency of the FM broadcasting band (88 to 108 MHz). The node between the second input terminal 11 and the series-tuned circuit 12 is grounded via a second capacitor 14. Thus, the series-tuned circuit 12 functions as an inductive element in the FM broadcasting band and at frequencies above, forming a low-pass filter 15 in association with the second capacitor 14. The cutoff frequency of the low-pass filter 15 is set between the lowest frequency of the VHF high band (approximately 170 MHz) and the highest frequency of the FM broadcasting band.

The second switching circuit 13 includes first switching diodes 13a and 13b connected in series between the second input terminal 11 and the output terminal 2 (i.e., between the series-tuned circuit 12 and the output terminal 2), the anodes thereof being connected to each other, and a second switching diode 13d, the cathode thereof being connected to the anodes of the first switching diodes 13a and 13b and the anode thereof being grounded at high frequencies via a ground capacitor 13c.

The cathode of the first switching diode 13a and the cathode of the first switching circuit 13b are each connected to the anode of the second switching diode 13d via resistors 13e, 13f, and 13g so as to conduct direct current. The node between the resistors 13e, 13f, and 13g is connected to the power supply terminal 6 via a resistor 16 and also to the collector of a switching transistor 17. The base of the switching transistor 17 is connected to the switching terminal 8, and the emitter thereof is grounded.

Furthermore, a parallel-tuned circuit 18 is connected in parallel to the second switching diode 13d at high frequencies. The parallel-tuned circuit 18 includes a third capacitor 18a connected between the cathode of the second switching diode 13d and the ground, and a second inductor 18b, one end thereof being connected to the cathode of the second switching diode 13d and the other end thereof being grounded at high frequencies via a ground capacitor 18c, and the tuning frequency thereof is set substantially to the center frequency of the FM broadcasting band.

The node between the second inductor 18b and the ground capacitor 18c is connected to the node between the resistors 5f, 5g, and 5h via a resistor 13h, and is grounded via a resistor 19.

The cathode of the first switching diode 13b is connected to the output terminal 2 via a DC cutting capacitor 20.

Figure 2:
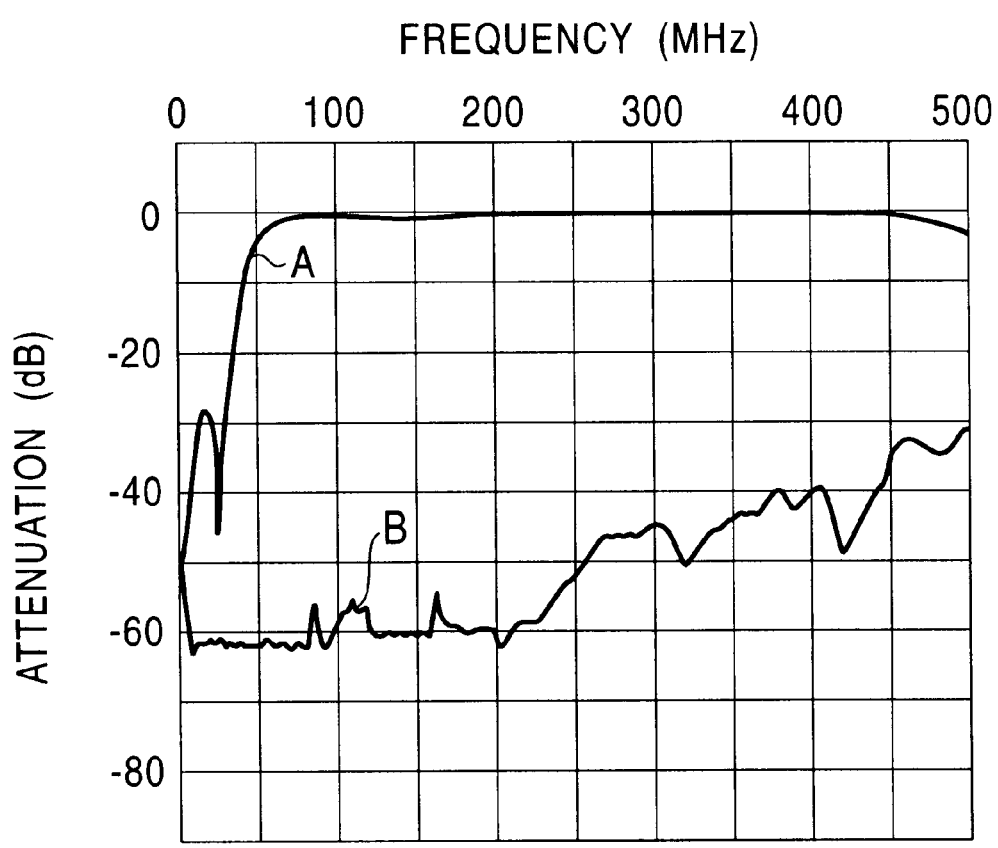
FIG. 2 is a graph showing the transmission characteristics in the input switching circuit according to the embodiment.
Figure 3:
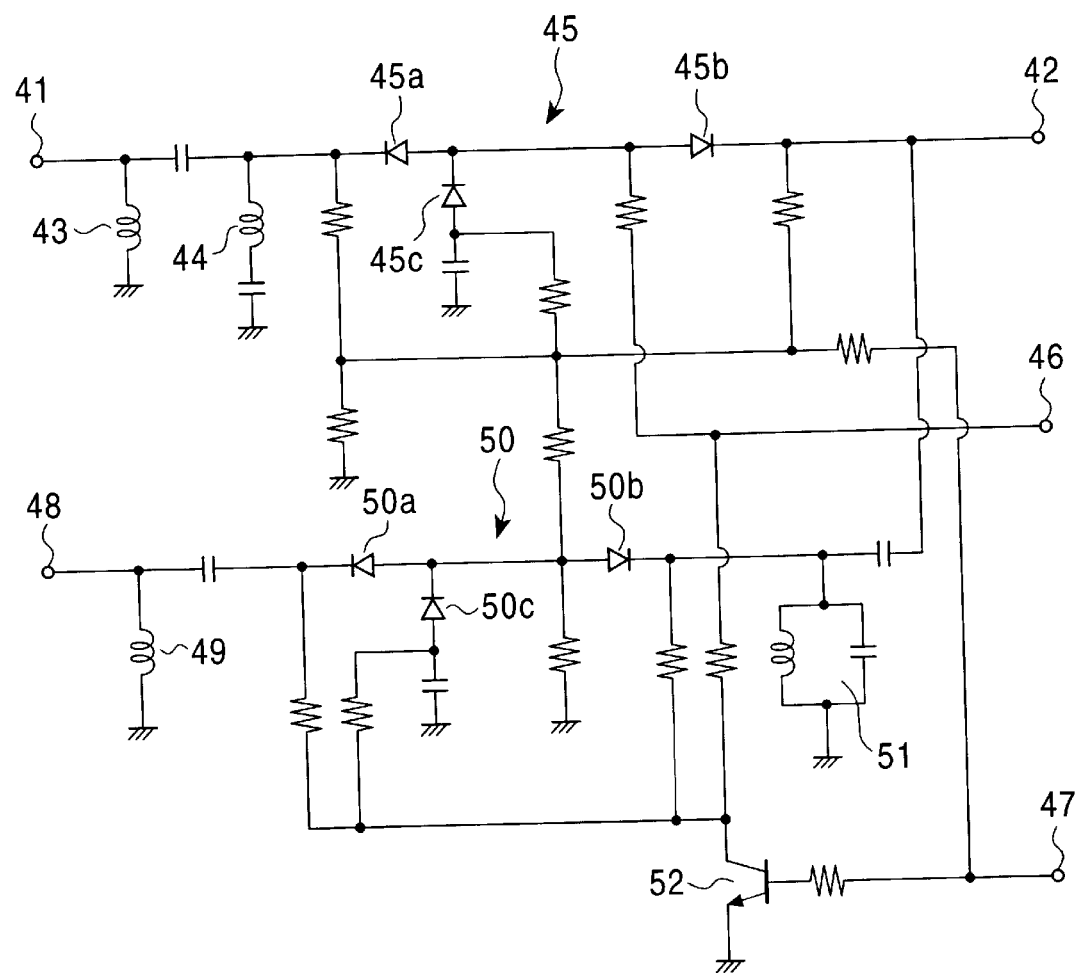
FIG. 3 is a circuit diagram of a conventional input switching circuit for a television tuner.
Figure 4:
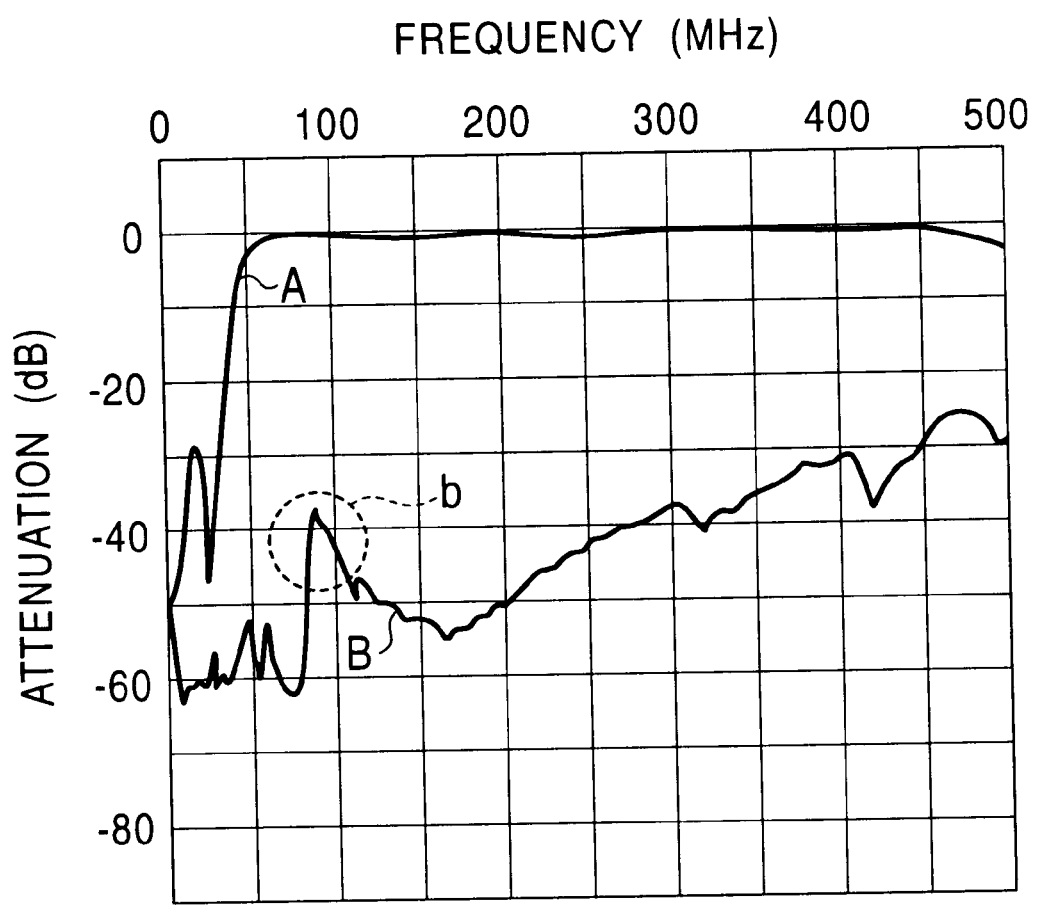
FIG. 4 is a graph showing the transmission characteristics in the conventional input switching circuit.

In the construction as above, when receiving a television signal, a low level switching voltage (e.g., 0 volts) is applied to the switching terminal 8. Then, in the first switching circuit 5, the first switching diodes 5a and 5b are turned on and the second switching diode 5d is turned off. Thus, the television signal input to the first input terminal 1 is passed through the first switching circuit 5 and output to the output terminal 2. Referring to FIG. 2, A indicates the transmission characteristics between the first input terminal 1 and the output terminal 2 at this time, in which frequencies around 27 MHz are attenuated and frequencies at and above approximately 50 MHz are transmitted.

At this time, the switching transistor 17 is turned off; thus, in the second switching circuit 13, the first switching diodes 13a and 13b are turned off and the second switching circuit 13d is turned on. Thus, even if an FM broadcasting signal leaking from the first switching diode 13a is applied to the parallel-tuned circuit 18, because the second switching diode 13d is turned on, the FM broadcasting signal is not tuned to by the parallel-tuned circuit 18. Accordingly, the FM broadcasting signal input to the second input terminal 11 is substantially inhibited from passing the second switching circuit 13, and the output level thereof at the output terminal 2 is extremely low. Referring to FIG. 2, B indicates the transmission characteristics between the second input terminal 11 and the output terminal 2, in which no peak is observed in the FM broadcasting band. Furthermore, with regard to frequencies above the FM broadcasting band, the transmission level is reduced by the low-pass filter 15 compared with the conventional art.

Meanwhile, when receiving an FM broadcasting signal, a high level switching voltage (e.g. a voltage equivalent to the voltage applied to the power supply terminal 6) is applied to the switching terminal 8. Then, in the first switching circuit 5, the first switching diodes 5a and 5b are turned off and the second switching diode 5d is turned on. Thus, the television signal input to the first input terminal 1 is blocked, not being output to the output terminal 2.

At this time, the switching transistor 17 is turned on; thus, in the second switching circuit 13, the first switching diodes 13a and 13b are turned on and the second switching diode 13d is turned off. Thus, the FM broadcasting signal input to the second input terminal 11 is passed through the second switching circuit 13 and output to the output terminal 2. Transmission of signals in the VHF high band and at frequencies above is blocked by the low-pass filter 15, avoiding interference in receiving the FM broadcasting signal.

What is claimed is:

1. An input switching circuit for a television tuner, comprising:
    a first input terminal, to which a television signal is input;
    a second input terminal, to which an FM broadcasting signal is input;
    an output terminal;
    a first switching circuit provided between said first input terminal and said output terminal, which, between said first input terminal and said output terminal, passes the television signal when receiving said television signal while blocking the television signal when receiving said FM broadcasting signal; and
    a second switching circuit provided between said second input terminal and said output terminal, which, between said second input terminal and said output terminal, passes the FM broadcasting signal when receiving said FM broadcasting signal while blocking the FM broadcasting signal when receiving said television signal;
    wherein said second switching circuit comprises:
        first two diodes connected in series with each other between said second input terminal and said output terminal, which are turned off when receiving said television signal and turned on when receiving said FM broadcasting signal; and
        a second diode connected between a node between said first two diodes and ground, which is turned on when receiving said television signal and turned off when receiving said FM broadcasting signal;
    and a parallel-tuned circuit which is tuned to frequencies of said FM broadcasting signal and is connected between a node, located between said first two diodes and said second diode, and ground.

2. An input switching circuit for a television tuner according to claim 1, wherein a series-tuned circuit comprising a first capacitor and an inductor is provided in series between said second input terminal and said second switching circuit, said series-tuned circuit being tuned to the frequencies of said FM broadcasting signal.

3. An input switching circuit for a television tuner according to claim 2, wherein a second capacitor is connected between one end of said series-tuned circuit and the ground, said series-tuned circuit and said second capacitor constituting a low-pass filter at and above the frequencies of said FM broadcasting signal, a cutoff frequency of said low-pass filter being set between a lowest frequency of a VHF high band and a highest frequency of said FM broadcasting signal.

* * * * *